United States Patent
Pereira et al.

(10) Patent No.: US 8,766,812 B2
(45) Date of Patent: Jul. 1, 2014

(54) TENSION SENSOR ASSEMBLY

(75) Inventors: Ken Pereira, Woodlake, CA (US);
Mark Crawford, Visalia, CA (US)

(73) Assignee: US Tower Corporation, Woodlake, CA (US)

( * ) Notice: Subject to any disclaimer, the term of this patent is extended or adjusted under 35 U.S.C. 154(b) by 154 days.

(21) Appl. No.: 13/284,756

(22) Filed: Oct. 28, 2011

(65) Prior Publication Data
US 2012/0105242 A1 May 3, 2012

Related U.S. Application Data

(60) Provisional application No. 61/407,562, filed on Oct. 28, 2010.

(51) Int. Cl.
G08B 21/00 (2006.01)

(52) U.S. Cl.
USPC ...................... 340/668; 73/862.391

(58) Field of Classification Search
USPC ............... 340/665–666, 668, 679–680, 685;
73/862.391, 862.621, 862.637;
52/118–121; 212/270–279, 296;
254/272–274; 242/357, 479.9–480,
242/484.8–484.9, 487.2, 534, 554.4, 563,
242/912
See application file for complete search history.

(56) References Cited

U.S. PATENT DOCUMENTS

| | | | |
|---|---|---|---|
| 4,046,355 A * | 9/1977 | Martin | 254/273 |
| 4,309,854 A * | 1/1982 | Vendramini | 52/121 |
| 4,928,925 A * | 5/1990 | Christison | 254/272 |
| 4,983,145 A * | 1/1991 | Hirai et al. | 474/117 |
| 5,101,215 A * | 3/1992 | Creaser, Jr. | 343/883 |
| 5,193,463 A * | 3/1993 | Kunczynski | 104/173.2 |
| 6,311,571 B1 * | 11/2001 | Norton | 73/862.637 |
| 2002/0026839 A1 * | 3/2002 | Lehtovaara | 73/862.637 |
| 2002/0095878 A1 * | 7/2002 | Henderson | 52/116 |
| 2003/0089544 A1 * | 5/2003 | Greib et al. | 180/268 |
| 2003/0155166 A1 * | 8/2003 | Sullivan et al. | 180/268 |
| 2003/0226403 A1 * | 12/2003 | Rogers et al. | 73/779 |
| 2004/0040926 A1 * | 3/2004 | Irsch et al. | 212/347 |
| 2004/0052582 A1 * | 3/2004 | Becker | 405/3 |
| 2004/0245761 A1 * | 12/2004 | Maloney et al. | 280/801.1 |
| 2004/0251366 A1 * | 12/2004 | Hishon et al. | 242/390.8 |
| 2005/0043130 A1 * | 2/2005 | Hao et al. | 474/135 |

(Continued)

FOREIGN PATENT DOCUMENTS

| | | | | |
|---|---|---|---|---|
| EP | 0296761 A2 * | 12/1988 | | B66D 1/395 |
| EP | 0361899 A1 * | 4/1990 | | F16H 7/12 |

(Continued)

*Primary Examiner* — Hai Phan
*Assistant Examiner* — Orlando Bousono
(74) *Attorney, Agent, or Firm* — The Webb Law Firm

(57) ABSTRACT

A tension detector may detect and help correct tension in a lift cable. The cable may include a lift cable within a telescopic structure, such as a telescopic tower. The tension sensor may detect when the cable tension is outside a high tension threshold and a low tension threshold and trigger an alert when outside the thresholds. The alert may be an audible alert or a visual alert. A controller may prevent a user from making the tension worse and encourage an operator to correct the tension problem by preventing a winch from expanding or retracting the telescopic structure. The tension sensor may use springs to calibrate the thresholds for the high tension and low tension and a series of pulleys to manipulate an arm to engage a tension sensor.

20 Claims, 7 Drawing Sheets

(56) References Cited

U.S. PATENT DOCUMENTS

| | | | |
|---|---|---|---|
| 2007/0089925 A1* | 4/2007 | Addleman | 180/313 |
| 2008/0023432 A1* | 1/2008 | Paschke | 212/298 |
| 2008/0220919 A1* | 9/2008 | Antchak et al. | 474/135 |
| 2008/0302601 A1* | 12/2008 | Baker | 182/69.4 |
| 2009/0011881 A1* | 1/2009 | Lehtovaara et al. | 474/135 |
| 2009/0110527 A1* | 4/2009 | Kardohely | 414/567 |
| 2009/0126313 A1* | 5/2009 | Jolly | 52/745.17 |

FOREIGN PATENT DOCUMENTS

| | | | | |
|---|---|---|---|---|
| WO | WO 96/21081 A1 * | 7/1996 | | E21B 19/22 |
| WO | WO 00/66479 A1 * | 11/2000 | | B66D 1/58 |
| WO | WO 2007/025374 A2 * | 3/2007 | | F16H 7/12 |
| WO | WO 2007/053509 A2 * | 5/2007 | | B66C 23/90 |
| WO | WO 2008/045897 A1 * | 4/2008 | | B66C 23/66 |
| WO | WO 2009/098496 A1 * | 8/2009 | | B66C 23/22 |

* cited by examiner

TENSION SENSOR ASSEMBLY

CROSS REFERENCE TO RELATED APPLICATIONS

The present application claims the priority benefit of U.S. provisional patent application 61/407,562, filed Oct. 28, 2010, and titled "Tension Sensor Assembly (TSA)", the disclosure of which is incorporated herein by reference.

BACKGROUND

Telescoping towers may be raised and lowered by operators controlling an electronic winch. When raising a telescoping tower using a winch, an operator may raise a tower section into position on the tower and secure the tower section with safety locks at the top of the base section. Guy cables may then be attached and tensioned to the first tower section.

Operators often make procedural mistakes when raising or lowering a telescoping tower section using a winch. For example, an operator may fail to secure a first tower section with safety locks at the top of the base section. As a result, guy cable tension may exert force against the winch which may overwhelm the winch. In addition to causing high tension conditions, operator error in using a winch may cause a low tension condition which could also damage the telescoping tower or supporting equipment.

What is needed is an improved system for managing tension in raising and lowering telescoping towers.

SUMMARY OF THE INVENTION

The present technology includes a tension detector may detect and help correct tension in a lift cable. The cable may include a lift cable within a telescopic structure, such as a telescopic tower. The tension sensor may detect when the cable tension is outside a high tension threshold and a low tension threshold and trigger an alert when outside the thresholds. The alert may be an audible alert or a visual alert. A controller may prevent a user from making the tension worse and encourage an operator to correct the tension problem by preventing a winch from expanding or retracting the telescopic structure. The tension sensor may use springs to calibrate the thresholds for the high tension and low tension and a series of pulleys to manipulate an arm to engage a tension sensor.

An embodiment includes a tension sensor having a housing, a low tension sensor mechanism, a high tension sensor mechanism, and an alert mechanism. The low tension sensor mechanism may be coupled to the housing and configured to receive the lift cable. The high tension sensor mechanism may be coupled to the housing and configured to receive the lift cable. The alert mechanism provides an alert when the low tension sensor mechanism detects a tension below a low tension threshold or the high tension sensor mechanism detects a tension above a high tension threshold.

An embodiment includes a system for sensing tension. The system includes a telescopic structure, a lift cable, a winch and a tension sensor. The winch controls the movement of the lift cable in the telescopic structure. The tension sensor receives the lift cable and detect when a tension in the lift cable is outside a specified tension range.

An embodiment includes a method for sensing tension in a lift cable used in a telescopic structure. The method may include operating a lift cable using a winch controlled by a controller. The lift cable may be configured to raise and lower a telescopic structure, such that the lift cable having a tension sensor attached to the lift cable. A tension may be detected in the lift cable by the tension sensor, the tension being outside a tension range. Triggering an alert by the tension sensor.

DETAILED DESCRIPTION

The present invention detects tension in a cable. The cable may include a lift cable within a telescopic structure, such as a telescopic tower. The tension sensor may detect when the cable tension is outside a high tension threshold and a low tension threshold and trigger an alert when outside the thresholds. The alert may be an audible alert or a visual alert. A controller may prevent a user from making the tension worse and encourage an operator to correct the tension problem by preventing a winch from expanding or retracting the telescopic structure. The tension sensor may use springs to calibrate the thresholds for the high tension and low tension and a series of pulleys to manipulate an arm to engage a tension sensor.

Figure 1:
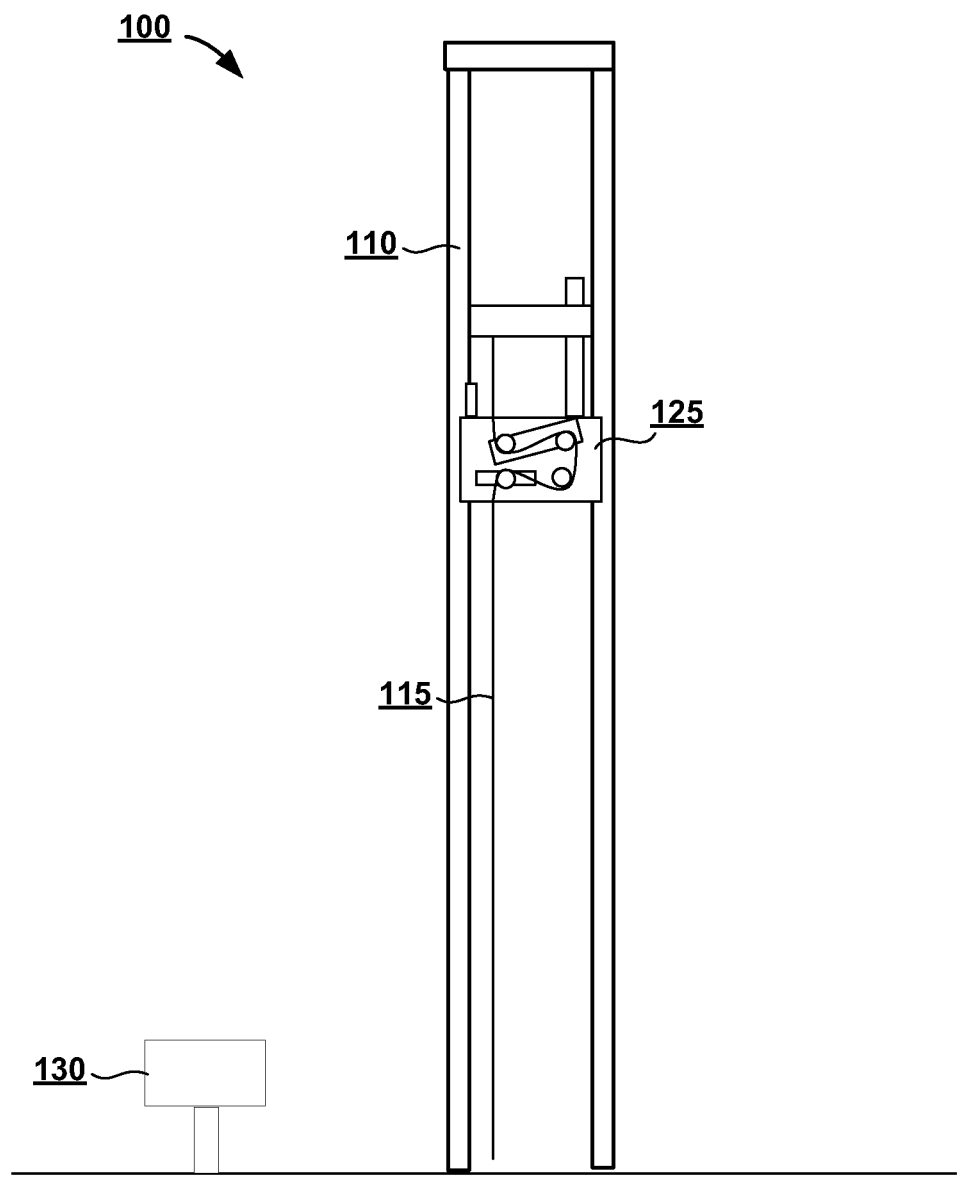
FIG. 1 illustrates an exemplary system for sensing tension in a lift cable.

FIG. 1 illustrates an exemplary system for sensing tension in a lift cable. The system of FIG. 1 includes a telescopic structure 110, cable support 120, tension sensor 125, lift cable 115, and controller 130. Lift cable 115 extends from cable support 120 down the length of the telescopic structure 110. The telescopic structure may be a telescopic tower or other structure. A winch (not illustrated) may be used to raise and lower the telescopic structure 110.

Controller 130 may be in communication with the winch and be used to operate the winch to raise and lower the lift cable. Controller 130 may include one a cable high tension visual sensor, cable low tension visual sensor, cable high tension audio sensor, controls for operating a winch coupled to the lift cable, and other inputs and outputs. The controller may include or control electric motors such as a tower winch. The controller may be integrated into the tower or be implemented remotely from the tower.

Figure 2:
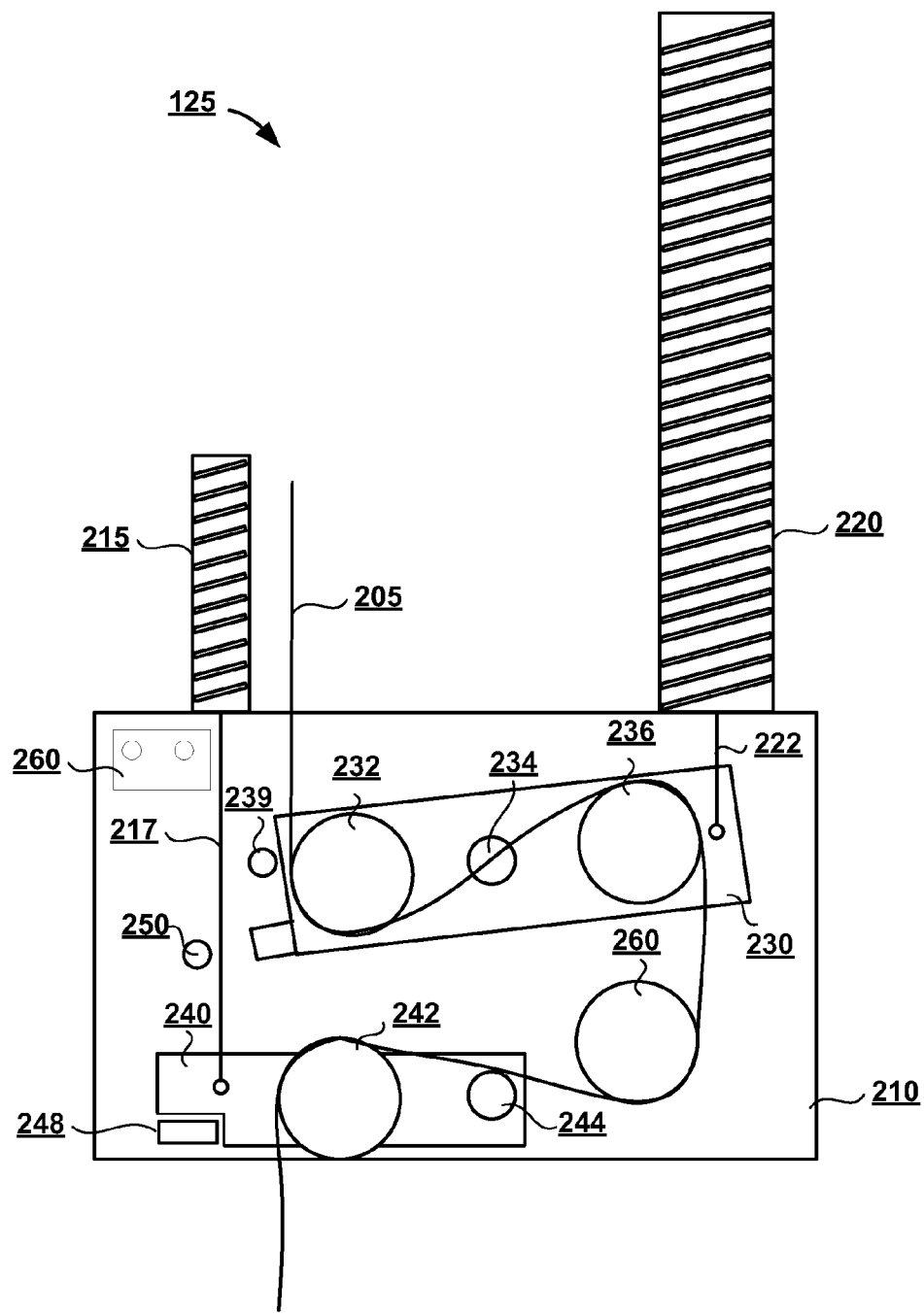
FIG. 2 illustrates an exemplary tension sensor for a cable having a normal tension.

FIG. 2 illustrates an exemplary tension sensor 125 for a cable having a normal tension. The tension sensor of FIG. 2 may be used in the tension sensing system of FIG. 1. Tension sensor 125 may include an assembly 210, a low tension spring 215, a high tension spring 220, a high tension arm 230, high tension pulleys 232 and 236, a high tension arm pivot 234, a high tension sensor 239, a low tension arm 240, a low tension pulley 242, low tension arm pivot 244, low tension block 248, low tension sensor 250, and idler pulley 260.

Lift cable 205 is routed below pulley 232 in a counter clockwise direction and above pulley 236 in a clockwise direction. Lift cable continues below pulley 250 in a clockwise direction and above pulley 242 in a counter-clockwise direction. Pulleys 232 and 236 are implemented on high tension bar 230 and pulley 242 is implemented on low tension bar 240.

The thresholds for triggering an alert are determined tension springs. High tension spring is coupled to an end of high tension arm 230 near pulley 236 and determines the threshold for triggering a high tension alert. Low tension spring is coupled to an end of low tension arm 240 near pulley above tension block 248 and determines the threshold for triggering a low tension alert.

Alert panel 260 may provide a visual or audible alert in response to a tension sensor being engaged. The alerts may be provided in place of or in addition to alerts generated on controller 130.

Figure 3:
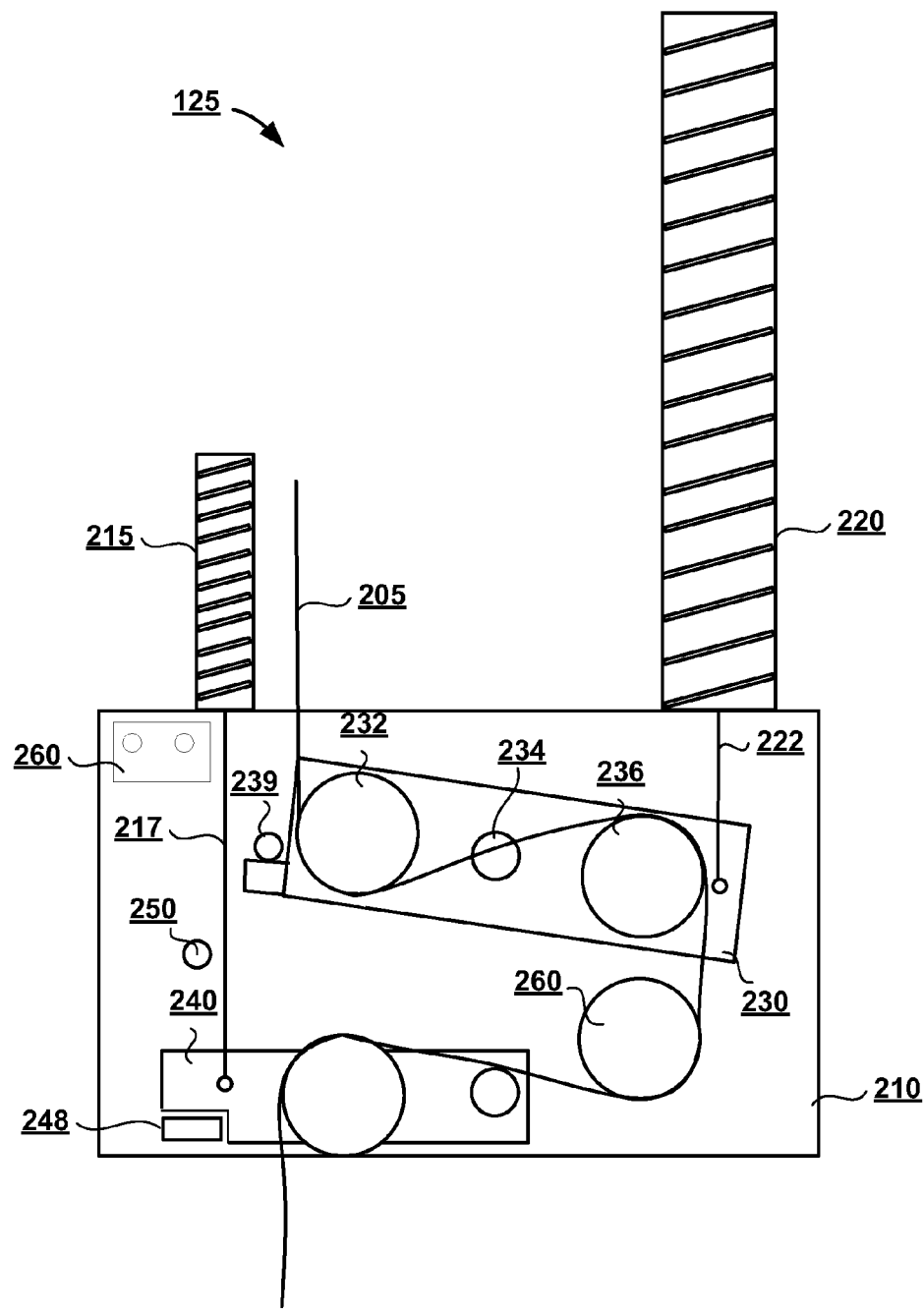
FIG. 3 illustrates an exemplary tension sensor for a cable having a high tension.

FIG. 3 illustrates an exemplary tension sensor for a cable having a high tension. When the tension applied to high tension pulleys 232 and 236 by lift cable 205 is great enough to overcome the tension applied to high tension pulleys 232 and 236 from high tension spring 220 (attached to high tension arm 230), high tension arm 230 rotates clockwise along pivot 234 to engage high tension sensor 239.

When high tension sensor 230 is engaged, an alert is generated. The alert may be an audio alert, a visual alert (such as an LED or a screen message), or both, indicating that the tension in the lift cable is too high. In response to the alert, controller 130 (FIG. 1) will automatically prevent the winch from extending the telescopic structure. Preventing extension of the telescopic structure prevents further tension increase and requires an operator to reduce the tension in the lift cable. When the high tension arm no longer engages the high tension sensor 239 (is not longer in contact with the sensor), the controller may allow the winch to extend the telescopic structure.

Figure 4:
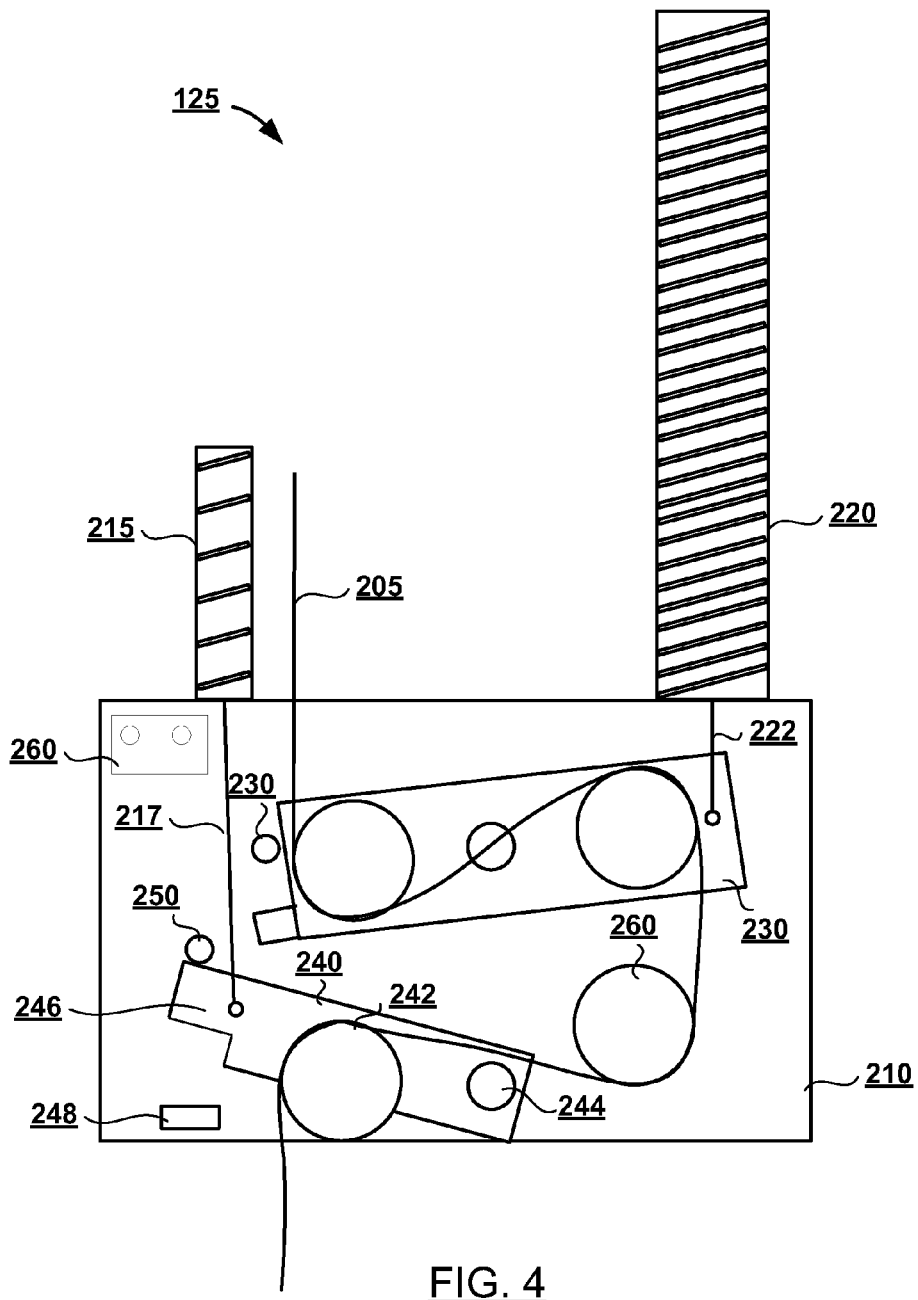
FIG. 4 illustrates an exemplary tension sensor for a cable having a low tension.

FIG. 4 illustrates an exemplary tension sensor for a cable having a low tension. When the tension applied to low tension pulley 242 by lift cable 205 is small enough to be overcome by the tension applied to low tension pulley 242 from low tension spring 215 (attached to low tension arm 240), low tension arm 230 rotates clockwise along pivot 244 to engage low tension sensor 240.

When low tension sensor 240 is engaged, an alert is generated. The alert may be an audio alert, a visual alert (such as an LED or a screen message), or both, indicating that the tension the lift cable is too little. In response to the alert, controller 130 (FIG. 1) will automatically prevent the winch from retracting the telescopic structure. Preventing retraction of the telescopic structure prevents further tension decrease and requires an operator to increase the tension in the lift cable. When the low tension arm no longer engages the low tension sensor 240 (is not longer in contact with the sensor), the controller may allow the winch to retract the telescopic structure.

Figure 5:
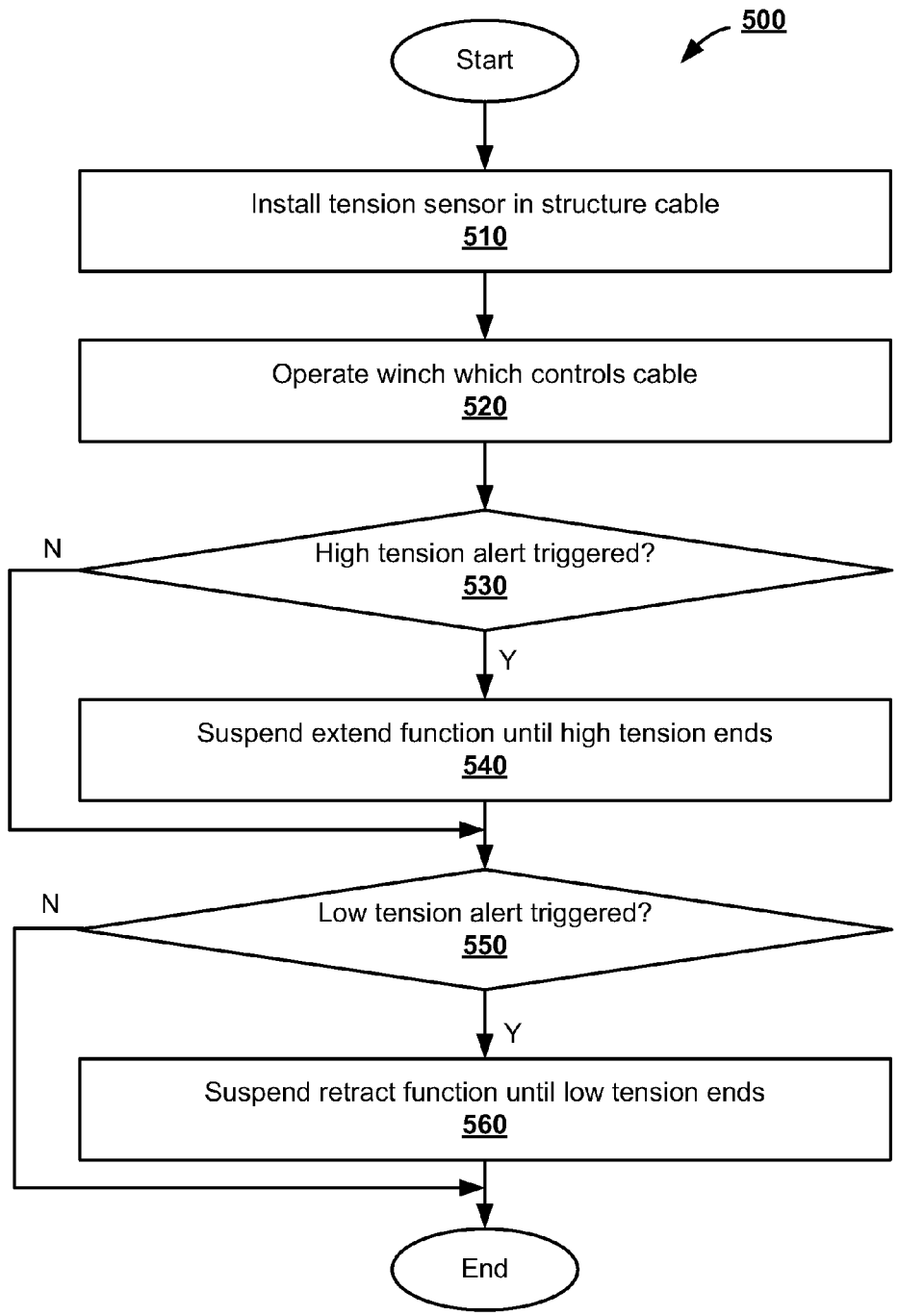
FIG. 5 illustrates an exemplary method for sensing tension in a cable.

FIG. 5 illustrates an exemplary method for sensing tension in a cable. The method of FIG. 5 may be performed by the system of FIG. 1. A tension sensor is installed in a telescopic structure lift cable at step 510. Installing a tension sensor in a cable includes routing the cable through a series of pulleys within the tension sensor, as discussed above with respect to FIG. 2.

An operator may operate a winch which controls the cable at step 520. The winch may be operated through controller 130. Operating the winch may include retracting and extending the telescopic structure using the lift cable.

A determination is made as to whether a high tension alert is triggered at step 530. A high tension alert may be triggered if the tension in the lift cable is greater than a threshold level. For example, tensioning a telescopic structure without locking structure portions in place may create a high tension. Determining whether a high tension alert is triggered is discussed in more detail below with respect to FIG. 6. If high tension alert is triggered at step 530, extending the telescopic structure may be suspended until the high tension is reduced below the threshold at step 540. For suspending the extension function of the telescopic structure, an operator may only retract the telescopic structure, which will reduce the high tension in the cable. The method of FIG. 5 then continues to step 550. If a high tension alert is not triggered, the method of FIG. 5 continues from step 530 to step 550.

A determination is made as to whether a low tension alert is triggered at step 550. A low tension alert may be triggered if the tension in the lift cable is less than a threshold level. For example, attempting to lower a telescopic structure without unlocking structure portions in place may create a low tension (slack in the cable). Determining whether a low tension alert is triggered is discussed in more detail below with respect to FIG. 7. If low tension alert is triggered at step 550, retracting the telescopic structure may be suspended until the low tension is increased to a point above the low tension threshold at step 560. For suspending the extension function of the telescopic structure, an operator may only expand the telescopic structure, which will increase the low tension in the cable. The method of FIG. 5 then ends. If a high tension alert is not triggered, the method of FIG. 5 ends.

Figure 6:
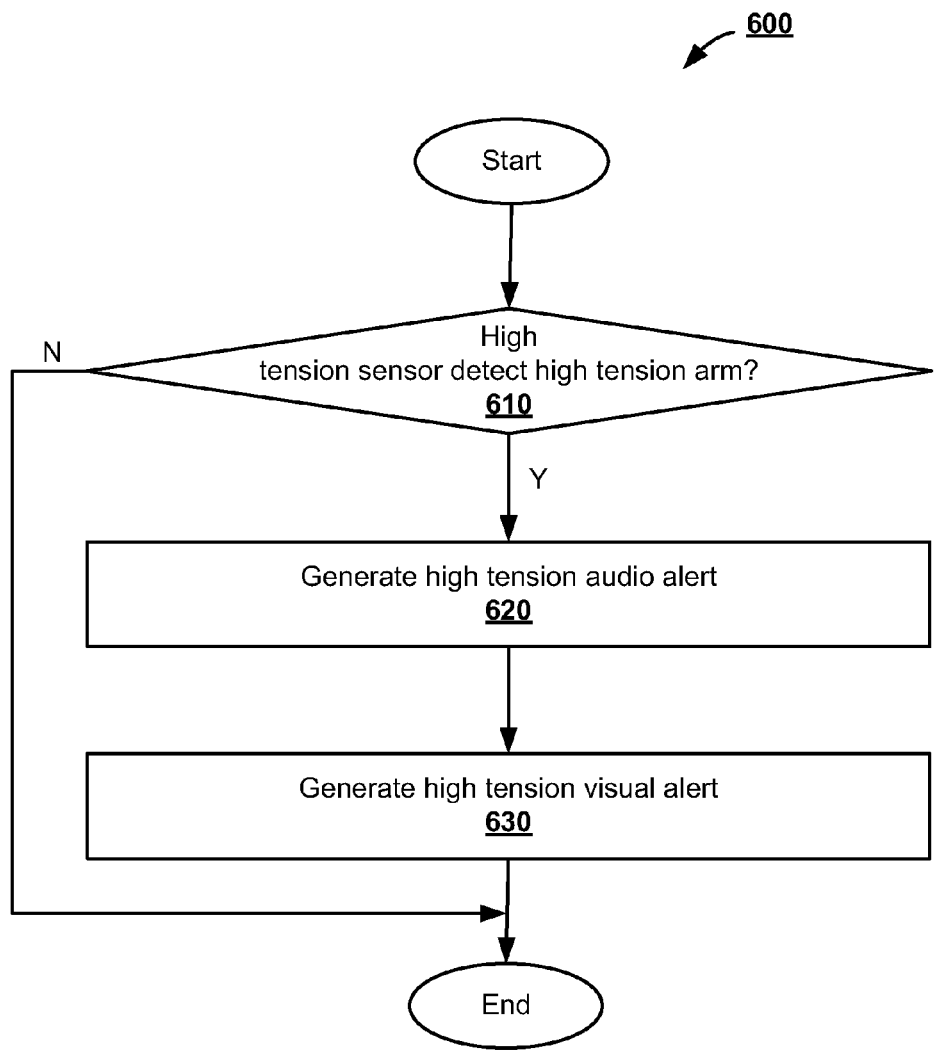
FIG. 6 illustrates an exemplary method for triggering a high tension alert.

FIG. 6 illustrates an exemplary method for triggering a high tension alert. The method of FIG. 6 provides more detail for step 530 of the method of FIG. 5. A determination is made as to whether a high tension sensor detects a high tension arm at step 610. When tension is increased in the lift cable which is routed through a tension sensor, the high tension arm rotates clockwise such that an arm end rotates close high tension sensor 239. If the high tension arm rotates clockwise and engages (e.g., touches) the high tension sensor, the high tension arm is detected at step 610 and the method of FIG. 6 continues to step 620. If the high tension arm does not engage the high tension sensor, the method of FIG. 6 ends.

A high tension audio alert is generated at step 620. The high tension audio alert may be generated at the controller 130, the tension sensor 210, and at other devices. A high tension visual alert is generated at step 630. The visual alert may include a series of one or more lights or LEDs, a graphical display, or some other visual output device. After generating the high tension visual alert, the method of FIG. 6 ends.

Figure 7:
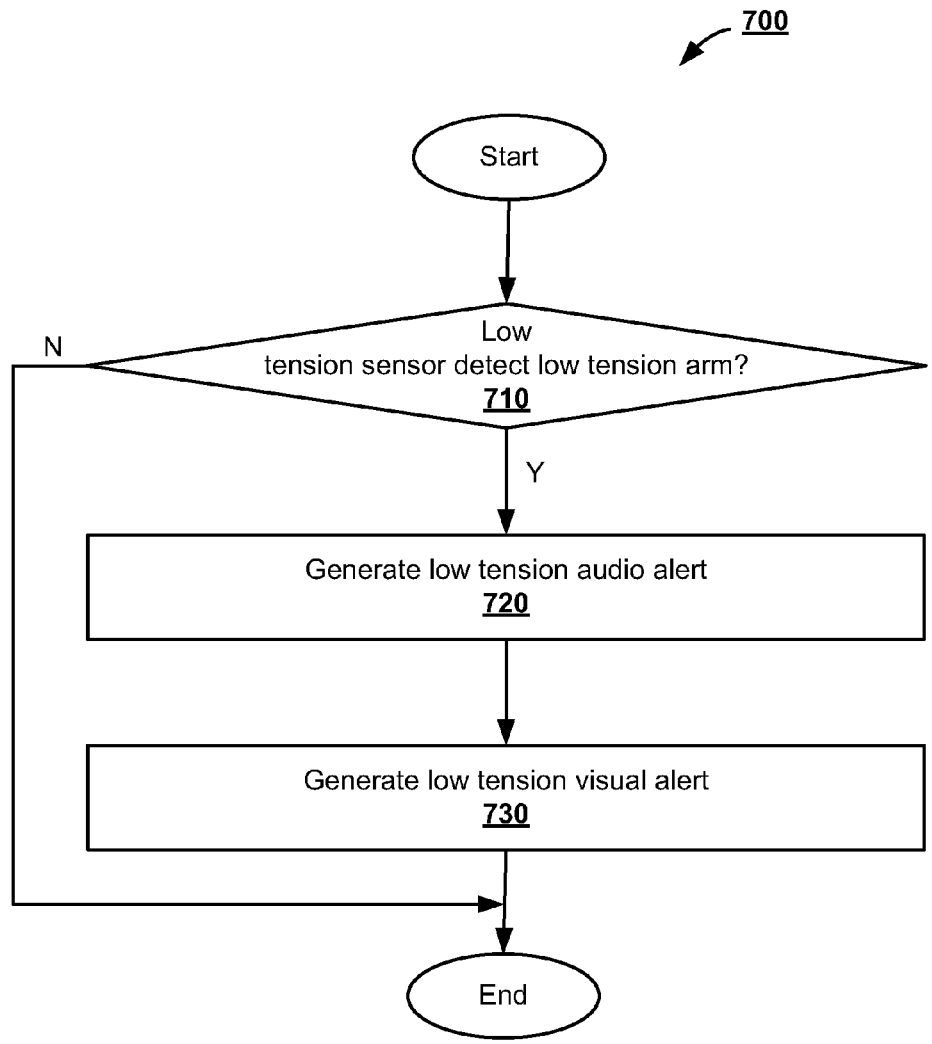
FIG. 7 illustrates an exemplary method for triggering a low tension alert.

FIG. 7 illustrates an exemplary method for triggering a low tension alert. The method of FIG. 6 provides more detail for step 550 of the method of FIG. 5. A determination is made as to whether a low tension sensor detects a low tension arm at step 710. When tension is decreased in the lift cable which is routed through a tension sensor, the low tension arm rotates clockwise such that an arm end rotates towards low tension sensor 250. If the low tension arm 240 rotates clockwise and engages (e.g., touches) the low tension sensor 250, the low tension arm is detected at step 710 and the method of FIG. 7 continues to step 720. If the low tension arm does not engage the low tension sensor, the method of FIG. 6 ends.

A low tension audio alert is generated at step 620. The low tension audio alert may be generated at the controller 130, the tension sensor 210, and at other devices. A low tension visual alert is generated at step 630. The visual alert may include a series of one or more lights or LEDs, a graphical display, or some other visual output device. After generating the high tension visual alert, the method of FIG. 6 ends.

The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. The embodiments and preferred features described above should be considered exemplary, with the invention being defined by the appended claims, which therefore include all such alternatives, modifications, permutations and equivalents as fall within the true spirit and scope of the present invention

What is claimed is:

1. A tension sensor system for sensing tension of a cable, comprising:
    a high-tension arm mounted on a first pivot and biased to rotate the high-tension arm along a first arc in a first direction;
    a low-tension arm mounted on a first pivot and biased to rotate the low-tension arm along a second arc in a first direction;
    a first pulley mounted on the high-tension arm and adapted to receive a cable such that tension on the cable exerts a force to rotate the high-tension arm along the first arc in a second direction;
    a second pulley mounted on the low-tension arm and adapted to receive the cable such that tension on the cable exerts a force to rotate the low-tension arm along the second arc in a second direction;
    a high-tension sensor configured to output a signal when the high-tension arm rotates to a high-tension position; and
    a low-tension sensor configured to output a signal when the low-tension arm rotates to a low-tension position.

2. The tension sensor system of claim 1, wherein:
    the high-tension arm is biased by a first spring; and
    the low-tension arm is biased by a second spring.

3. The tension sensor system of claim 1, further including a stop member disposed at a location along the second arc in a path of rotation of the low-tension arm to stop rotation of the low-tension arm in the second direction.

4. The tension sensor system of claim 1, further including an alert mechanism coupled to the high-tension sensor and the low-tension sensor and activated in response to a signal from one of the high-tension sensor and the low-tension sensor.

5. The tension sensor system of claim 4, wherein the alert mechanism provides an audio alert.

6. The tension sensor system of claim 5, wherein the audio alert is a first audio alert indicating low-tension and a second audio alert indicating high tension.

7. The tension sensor system of claim 4, wherein the alert mechanism provides a visual alert.

8. The tension sensor system of claim 7, wherein the visual alert is a first visual alert indicating low-tension and a second visual alert indicating high tension.

9. The tension sensor system of claim 1, further including a cable under tension engaged by the first and second pulleys.

10. A tension sensor system for sensing tension of a cable, comprising:
    a mounting structure configured to permit a cable to extend along a cable path therethrough from a first side of the mounting structure to a second side of the mounting structure;
    a high-tension arm pivotally mounted to the mounting structure by a first pivot and biased to exert a force to rotate the high-tension arm about the first pivot in a first direction;
    a low-tension arm pivotally mounted to the mounting structure through a second pivot and biased to exert a force to rotate the low-tension arm about the second pivot in a first direction;
    a first high-tension pulley mounted on the high-tension arm and adapted to receive the cable from the first side of the mounting structure, such that tension on the cable exerts a force to rotate the high-tension arm about the first pivot in a second direction;
    a low-tension pulley mounted on the low-tension arm and adapted to receive the cable from the second side of the mounting structure, such that tension on the cable exerts a force to rotate the low-tension arm about the first pivot in a second direction;
    at least one idler pulley disposed along the cable path between the high-tension pulley and the low-tension pulley at a position to direct the cable from one of the first high-tension pulley and the low-tension pulley to the other one of the first high-tension pulley and the low-tension pulley;
    a high-tension sensor configured to output a signal when the high-tension arm rotates about the first pivot to a high-tension position; and
    a low-tension sensor configured to output a signal when the low-tension arm rotates to a low-tension position.

11. The tension sensor system of claim 10, wherein an orientation of the cable received at the first side of the mounting structure is substantially parallel to an orientation of the cable received at the second side of the mounting structure.

12. The tension sensor system of claim 10, further comprising a second high-tension pulley mounted on the high-tension arm on an opposite side of the pivot from the first high-tension pulley, adapted to receive the cable from the first high-tension pulley, such that tension on the cable exerts a force to rotate the high-tension arm about the first pivot in the second direction.

13. The tension sensor system of claim 10, wherein:
    the high-tension arm is biased by a first spring; and
    the low-tension arm is biased by a second spring.

14. The tension sensor system of claim 10, further including a stop member mounted to the mounting structure, disposed at a location along a path of the low-tension arm to stop rotation of the low-tension arm in the second direction.

15. The tension sensor system of claim 10, further including an alert mechanism coupled to the high-tension sensor and the low-tension sensor and activated in response to a signal from one of the high-tension sensor and the low-tension sensor.

16. The tension sensor system of claim 10, further including a cable extended along the cable path.

17. A tension sensor system for sensing tension of a cable, comprising:
    a high-tension sensor arm mounted on a first pivot;
    a first spring having a first spring constant and coupled to the high-tension sensor arm to exert a first moment of force to rotate the high-tension sensor arm about the first pivot in a first direction;
    a first pulley coupled to the high-tension sensor arm and adapted to receive a cable wherein tension on the cable exerts a second moment of force to rotate the high-tension sensor arm about the first pivot in a second direction, the high-tension arm disposed in mechanical equilibrium at an angular position that is a function of the first moment of force and the second moment of force;

a low-tension sensor arm mounted on a second pivot;

a second spring having a second spring constant and coupled to the low-tension sensor arm to exert a third moment of force to rotate the low-tension sensor arm about the second pivot in a first direction;

a second pulley coupled to the low-tension sensor arm and adapted to receive the cable wherein tension on the cable exerts a fourth moment of force to rotate the low-tension sensor arm about the second pivot in a second direction, the low-tension arm disposed in mechanical equilibrium at an angular position that is a function of the third moment of force and the fourth moment of force;

a high-tension sensor positioned to generate a signal when the high-tension arm is at a preselected angular position; and a low-tension sensor positioned to generate a signal when the low-tension arm is at a preselected angular position.

18. The tension sensor system of claim 17, further including a stop member disposed at a location along a path of rotation of the low-tension arm to stop rotation of the low-tension arm in the second direction.

19. The tension sensor system of claim 17, further including an alert mechanism coupled to the high-tension sensor and the low-tension sensor and activated in response to a signal from one of the high-tension sensor and the low-tension sensor.

20. The tension sensor system of claim 17, wherein rotation of the low-tension arm in the second direction is limited by a stop member.

\* \* \* \* \*